United States Patent [19]

Ohgami et al.

[11] Patent Number: 5,168,423
[45] Date of Patent: Dec. 1, 1992

[54] PORTABLE ELECTRONIC APPARATUS HAVING A DISPLAY UNIT ROTATING IN VERTICAL AND HORIZONTAL DIRECTIONS

[75] Inventors: Keizo Ohgami; Takashi Hosoi, both of Tokyo, Japan

[73] Assignee: Kabushiki Kaisha Toshiba, Kawasaki, Japan

[21] Appl. No.: 578,659

[22] Filed: Sep. 7, 1990

[30] Foreign Application Priority Data

Sep. 7, 1989 [JP] Japan ................... 1-230328

[51] Int. Cl.⁵ .................... H05K 5/02; G06F 1/00
[52] U.S. Cl. .................... 361/394; 361/380; 248/921; 248/923
[58] Field of Search ............... 248/183, 278, 349, 919, 248/921, 922, 923; D14/100, 106; 364/708; 361/380, 390, 391, 392, 393, 394, 395, 399

[56] References Cited

U.S. PATENT DOCUMENTS

| D. 324,038 | 2/1992 | Izaki | D14/106 |
|---|---|---|---|
| 4,738,422 | 4/1988 | Matheson et al. | 248/921 X |
| 4,864,523 | 9/1989 | Sasaki | 364/708 |
| 4,919,387 | 4/1990 | Sampson | 248/921 |
| 5,016,849 | 5/1991 | Wu | 248/923 X |
| 5,034,858 | 7/1991 | Kawamoto et al. | 364/708 X |

FOREIGN PATENT DOCUMENTS 89138783 3/1990 Fed. Rep. of Germany .

Primary Examiner—Leo P. Picard
Assistant Examiner—Michael W. Phillips
Attorney, Agent, or Firm—Cushman, Darby & Cushman

[57] ABSTRACT

A portable computer has a base unit and a flat panel display unit. The base unit has a keyboard and a turntable rotatably connecting to the base unit in a horizontal direction. A display support is fixed to the turntable. The flat panel display unit is pivotally connected to the display supporter. The flat panel display unit rotates in the vertical direction between a closed position for covering the keyboard and an open position for operating the keyboard. The flat panel display unit rotates with the turntable in a horizontal direction between the open position and a twisted position for twisting the flat panel display unit. A display stopper prevents the flat panel display from rotating in the vertical direction when it is in the twisted position.

21 Claims, 12 Drawing Sheets

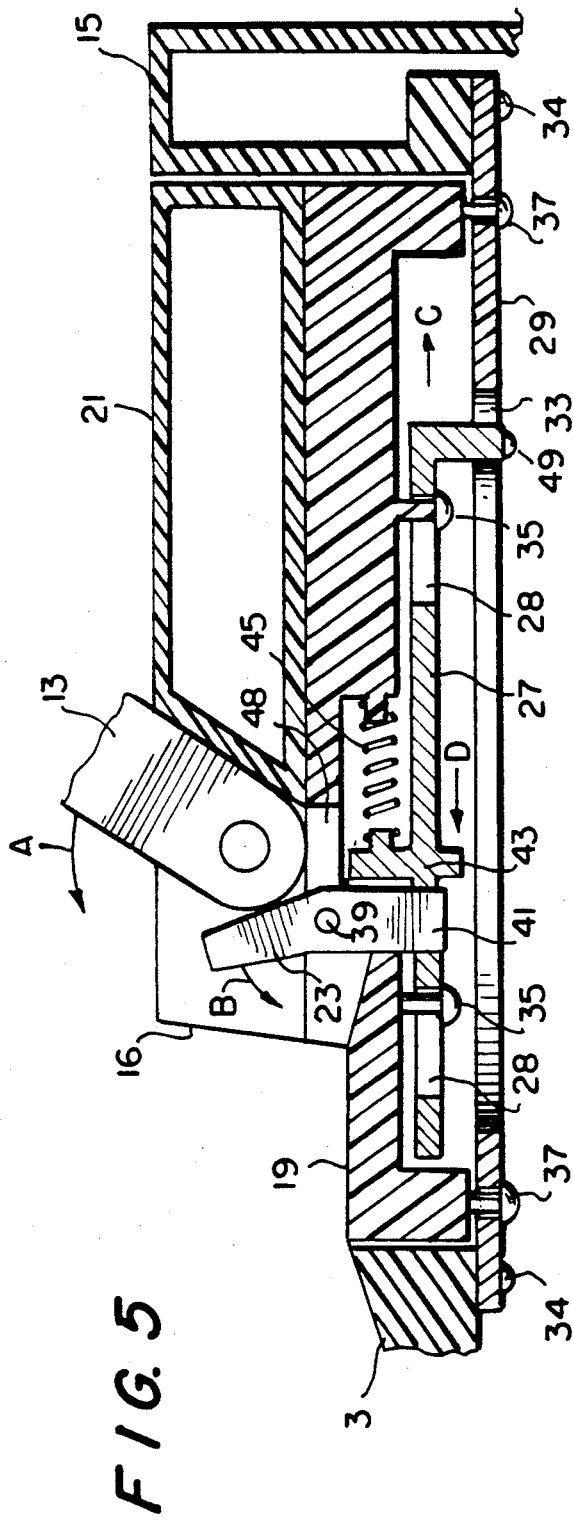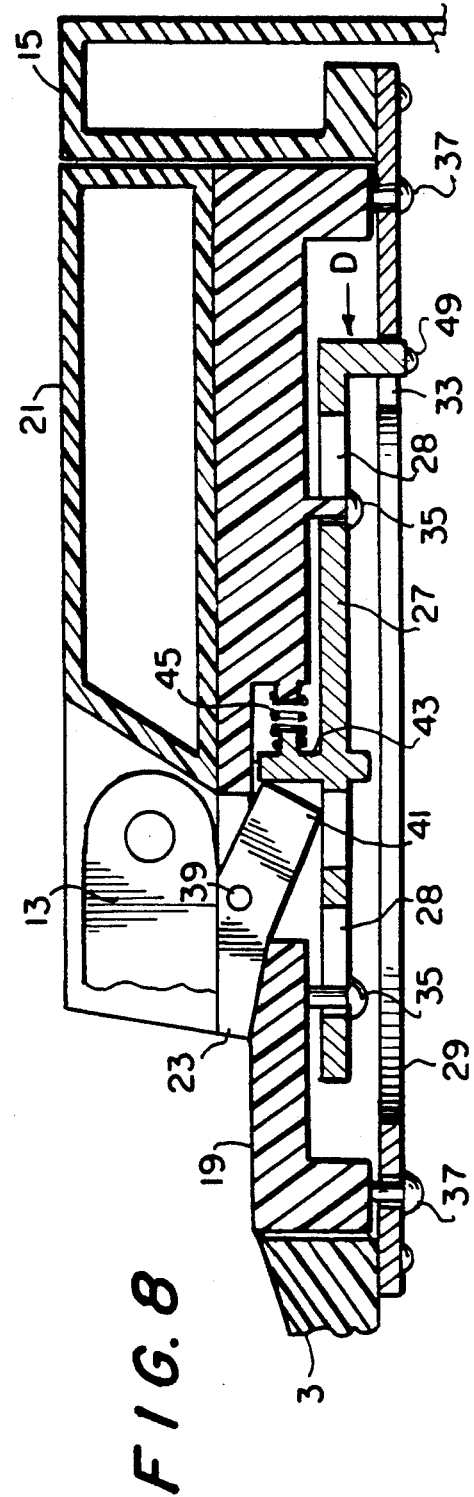

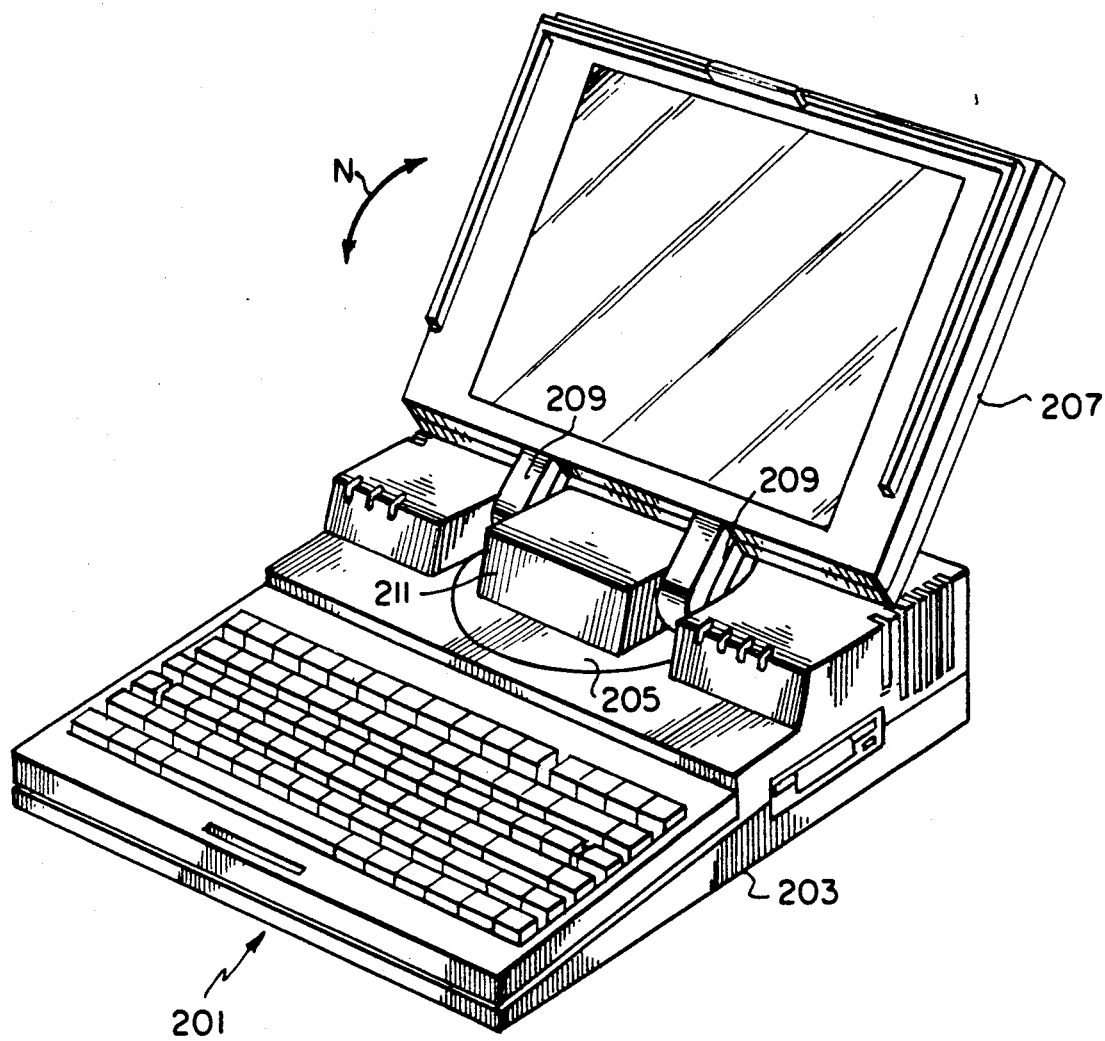
F I G. 14

PORTABLE ELECTRONIC APPARATUS HAVING A DISPLAY UNIT ROTATING IN VERTICAL AND HORIZONTAL DIRECTIONS

BACKGROUND OF THE INVENTION

1. Field of the Invention

This invention relates to a portable electronic apparatus, such as a laptop computer or a portable word processor. More particularly, this invention relates to a portable electronic apparatus having a display unit mounted in a way to allow rotating in a horizontal and a vertical direction.

2. Description of the Related Art

A laptop computer disclosed in U.S. Pat. No. 4,864,523 has a base unit and a display unit pivotally connected to the base unit. The base unit has a keyboard. The display unit has a display screen and can vertically rotate between a closed position where it covers the keyboard and an open position where the keyboard is exposed and can be operated.

When an operator operating the keyboard wants to show the display screen to a neighboring operator, however, the operator has to horizontally rotate the base unit itself, because the display unit of U.S. Pat. No. 4,864,523 can be rotated in a vertical direction only.

SUMMARY OF THE INVENTION

It is an object of the present invention to provide a portable electronic apparatus having a display unit which can horizontally rotate without requiring a horizontal rotation of the associated base unit.

It is still another object of the present invention to provide a portable electronic apparatus having a base unit having a display storing portion, and a display unit which can horizontally and vertically rotate relative to a base unit and can be stored on the display storing portion.

In order to achieve these objects, a portable electronic apparatus of the present invention comprises a body unit having a keyboard, a display supporter, mounted on the body unit, horizontally rotating relative to the base unit, and a display unit pivotally connected to the display supporter.

According to the portable electronic apparatus of this invention, the display unit can vertically and horizontally rotate by the display supporter. The display unit vertically rotates between a closed position for covering the keyboard and an open position for operating the keyboard and horizontally rotates between the open position and a twisted position for changing a horizontal angle of the display unit relative to the open position.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiments given below, serve to explain the principles of the invention.

FIG. 5 is a side view of FIG. 4, partly in cross section;

FIG. 8 is a side view of FIG. 7, partly in cross section.

FIG. 14 is a perspective view of a laptop computer according to a third embodiment of the present invention.

DETAILED DESCRIPTION OF THE PREFERRED EMBODIMENTS

Figure 1:
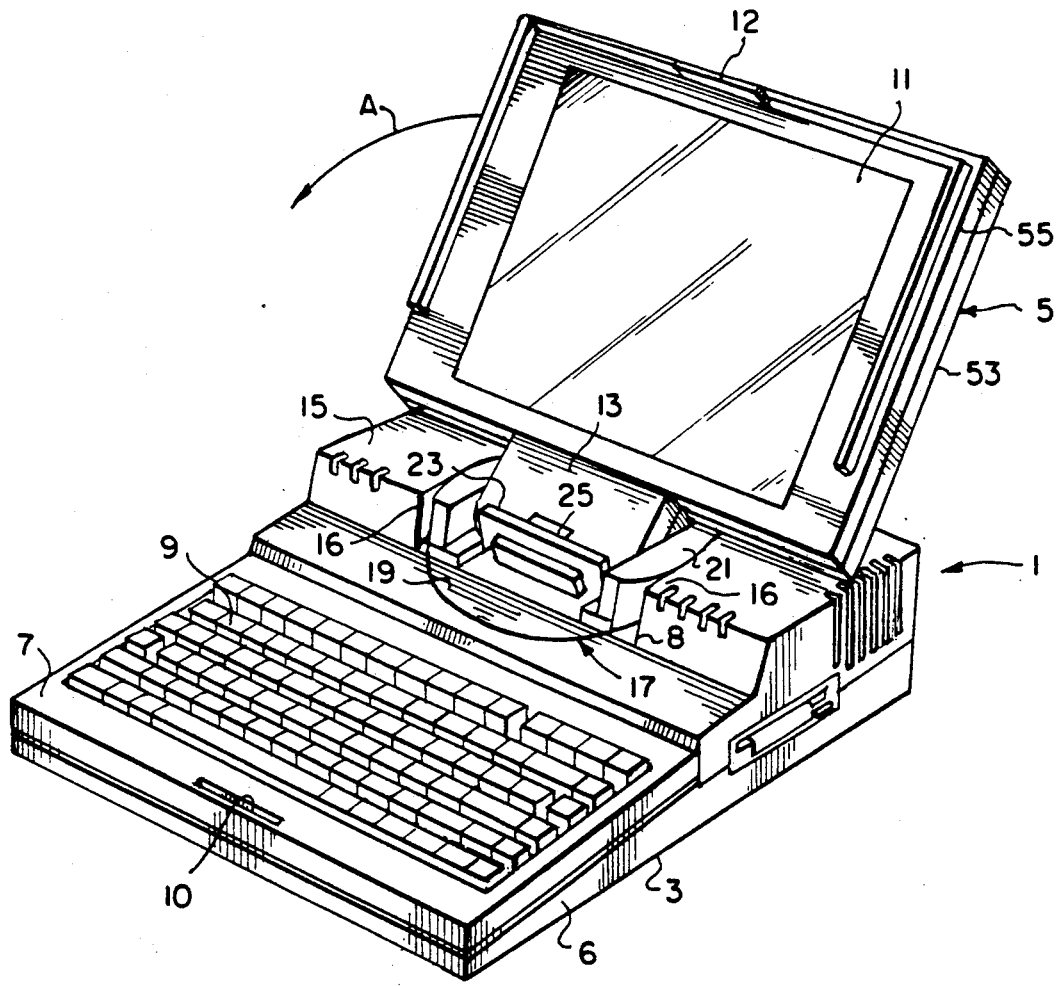
FIG. 1 is a perspective view of a laptop computer according to a first embodiment of the present invention.
Figure 2A:
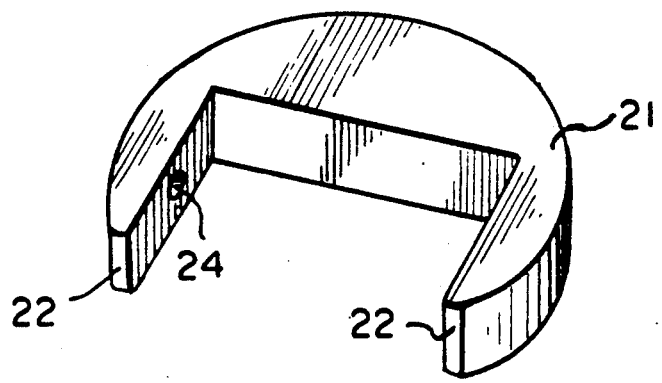
FIGS. 2A–2D are exploded perspective views of a turntable unit.
Figure 2B:
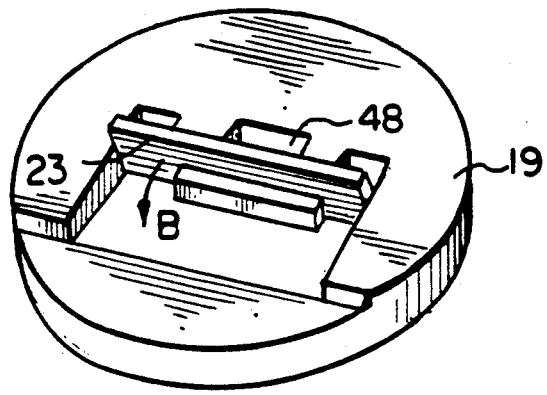
Figure 2C:
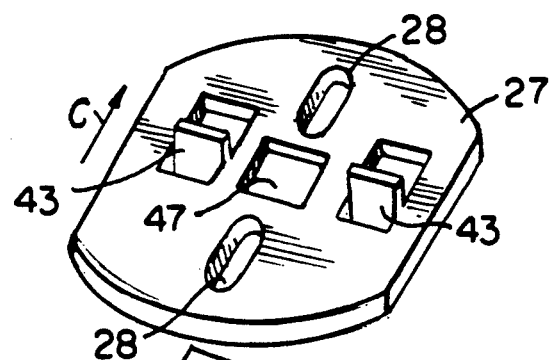
Figure 2D:
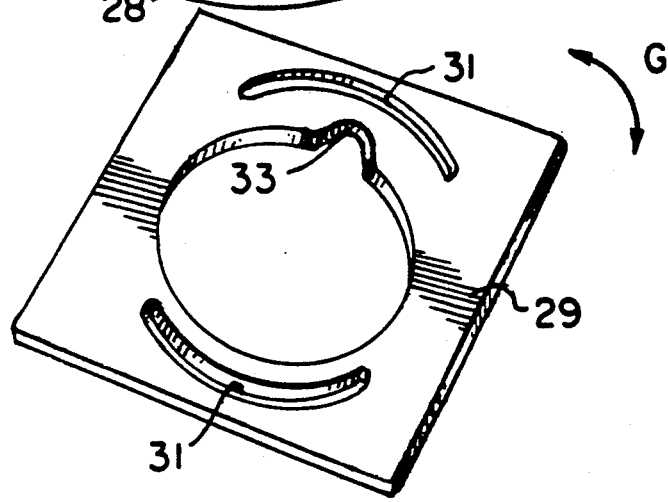

FIG. 1 illustrates a laptop computer, when a display unit is set in an open position, according to a first embodiment of the present invention.

A portable computer 1 has a body unit 3 and a display unit 5. Body unit 3 has a bottom case 6, a front upper case 7 and a rear upper case 15. Front upper case 7 has a keyboard 9 and a latch hole 10. Rear upper case 15 has a recess portion 8 and a pair of inner corners 16. A turntable unit 17 is mounted in recess 8. Turntable unit 17 has a turntable 19, a display supporter 21 and a display stopper 23. Turntable 19 rotates relative to base unit 3 in a horizontal direction. Display supporter 21 is fixed on turntable 19, and display stopper 23 is pivotally connected to turntable 19. Display unit 5 has an outer case 53, an inner case 55, a display screen 11, a latch claw 12 and a leg 13. Leg 13 is pivotally connected to display supporter 21 by a hinge device 51 (shown in FIG. 11) fixed to outer case 53. Display unit 5 rotates in a vertical direction between a closed position (shown in FIG. 6) for covering keyboard 9 and an open position (shown in FIG. 1) for operating keyboard 9. A cable guide duct 25 is provided between turntable 19 and leg 13 of display unit 5. Cable guide duct 25 guides a cable 73 (shown in FIG. 11) for electrically connecting display unit 5 to base unit 3. An example of cable guide duct 25 is disclosed in U.S. Pat. No. 4,864,523, the disclosure of which is hereby incorporated by reference.

FIGS. 2A–2D are exploded perspective views of the parts of turntable unit 17.

Turntable unit 17 has turntable 19 (FIG. 2B), with display supporter 21 fixed on turntable 19 and display stopper 23 pivotally connected to turntable 19 (FIG. 2B), a slide plate 27 (FIG. 2C) slidably connected to turntable 19 and a twist guide plate 29 (FIG. 2D), fixed to base unit 3, for guiding a horizontal movement of turntable 19 relative to base unit 3. Twist guide plate 29 is fixed on an inner surface of rear upper case 15 by screws 34 (shown in FIG. 5). Display supporter 21 has a pair of inner side walls 22. Each inner side wall 22 has an axis hole 24 fixed to one end of hinge device 51 (FIG. 11) for rotating display unit 5 in the vertical direction, respectively. Display stopper 23 is pivotally connected to turntable 19. Display stopper 23 is rotatable in a direction of an arrow B. Slide plate 27 has a pair of straight guide slits 28. Each guide slit 28 guides one of a first guiding projections 35 (shown in FIGS. 4 and 5) mounted on a bottom surface of turntable 19, respectively. Slide plate 27 has a pair of pusher plates 43. Each pusher plate 43 can be pushed in a direction of an arrow C by a pushing portion 41 (shown in FIGS. 4 and 5) of display stopper 23, respectively. When display stopper 23 rotates in the direction of arrow B, pushing portion 41 push pushed plates 43. Slide plate 27 slides along straight guide slits 28 in the direction of arrow C. Slide plate 27 has a first cable guide hole 47. Turntable 19 has a second cable guide hole 48 (shown in FIG. 5). Cable 73 (shown in FIG. 11) and electrically connects display unit 5 and base unit 3, is guided in first and second cable guide holes 47, 48. Twist guide plate 29 has a pair of curved guide slits 31. Each curved guide slit 31 guides one of a second guiding projection 37 (shown in FIGS. 4 and 5) mounted on the bottom surface of turntable 19 in a direction of an arrow G, respectively. Twist guide table 29 has an inner recess 33 and a inner stopper wall 34. When display unit 5 rotates in the direction of arrow A from the open position, a stopper pin 49 (shown in FIGS. 4 and 5) mounted on slide plate 27 is inserted in inner recess 33. Consequently display unit 5 rotates in the closed position.

Figure 3:
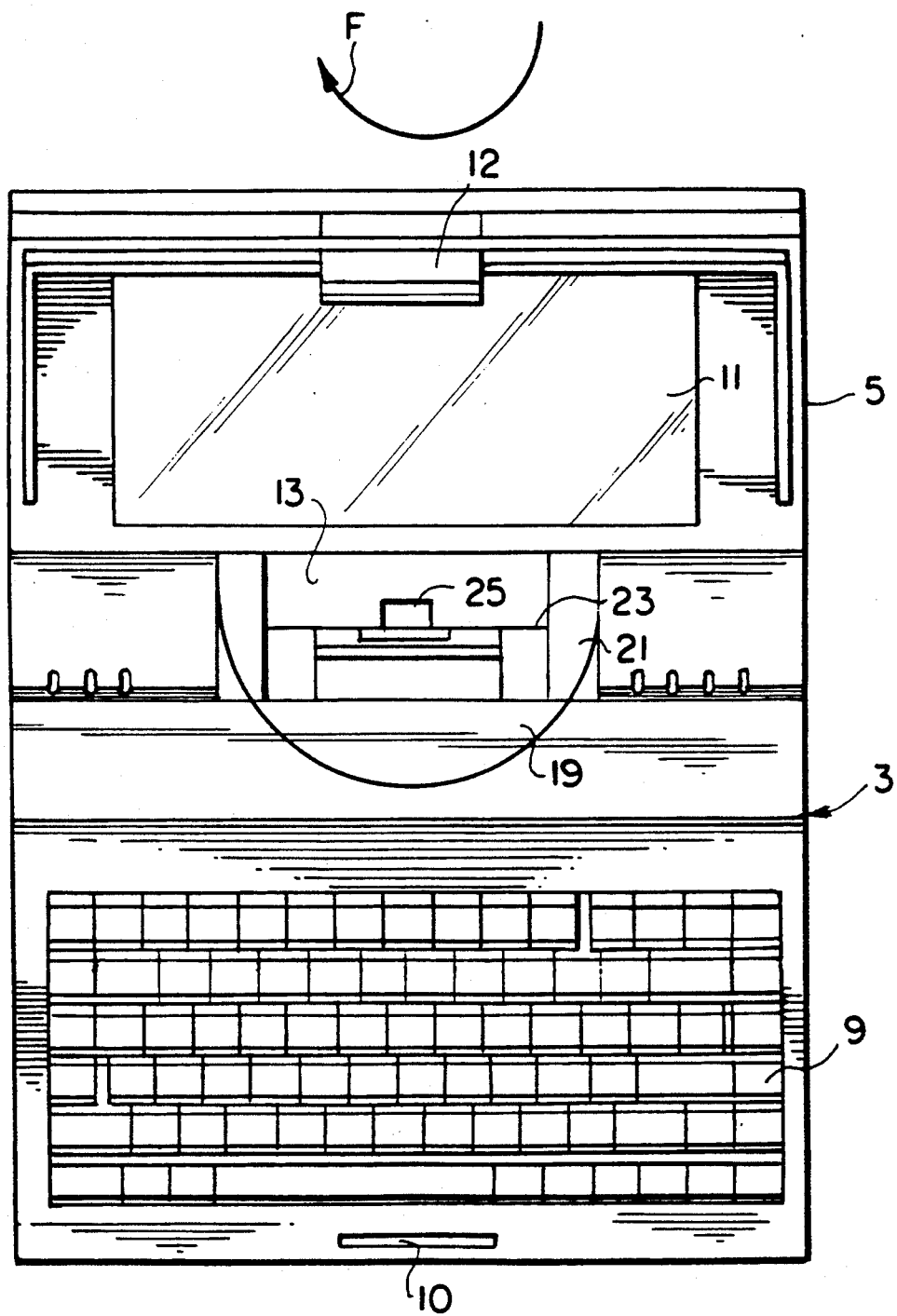
FIG. 3 is a plan view of FIG. 1.
Figure 4:
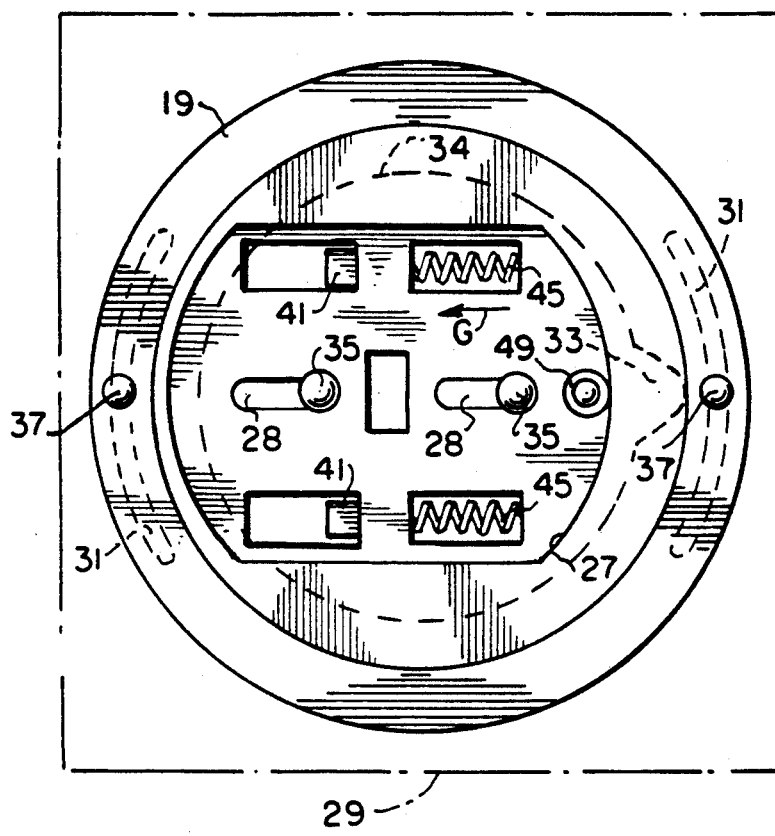
FIG. 4 is a bottom view of the turntable unit when the display unit is set in the open position.

FIG. 3 is a plan view of FIG. 1. FIG. 4 is a bottom view of turntable unit 17 and FIG. 5 is a side view of FIG. 4, partly in cross section, when display unit 5 is set in the open position.

When display unit 5 is set in the open position shown in FIG. 3, it causes turntable unit 17 to come to a first position shown in FIG. 4 and FIG. 5. Each of first guiding projections 35 mounted on the bottom surface of turntable 19 is inserted in one of straight guide slits 28 of slide plate 27, respectively. Each of second guiding projections 37 mounted on the bottom surface of turntable 19 is inserted in one of curved guide slits 31 of twist guide plate 29, respectively. Display stopper 23 is pivotally connected to turntable 19 by an axis 39. Display stopper 23 rotates in the direction of arrow B. Display stopper 23 has a pushing portion 41 for pushing pusher plate 43 of slide plate 27. A pair of coil springs 45 are provided between turntable 19 and slide plate 27. Coil springs 45 supply slide plate 27 with a force in a direction of an arrow D. Cable 73 (shown in FIG. 11) is guided in first cable guide hole 47 (shown in FIG. 4) and second cable guide hole 48 (shown in FIG. 5). Slide plate 27 has a stopper pin 49. Stopper pin 49 is inserted in inner recess 33 when display unit 5 rotates from the open position to the closed position, and stopper pin 49 prevents slide plate 27 from sliding in the direction of arrow G (shown in FIG. 10) when display unit 5 vertically rotates from a twisted position (shown in FIG. 9).

When an operator rotates display unit 5, set in the open position shown in FIG. 3, in the direction of arrow A (shown in FIG. 1), leg 13 of display unit 5 pushes display stopper 23. Display stopper rotates around axis 39 in the direction of arrow B. Pushing portions 41 of display stopper 23 push pushed plates 43 of slide plate 27. Slide plate 27, against the force of coil springs 45 in the direction of arrow D, slides along straight guide slits 28 in the direction of arrow C. When slide plate 27 slides in the direction C, stopper pin 49 is inserted in inner recess 33 of twist guide plate 19. Consequently display stopper 23 folds on turntable 19 and display unit 5 is set in the closed position shown in FIG. 6.

Figure 7:
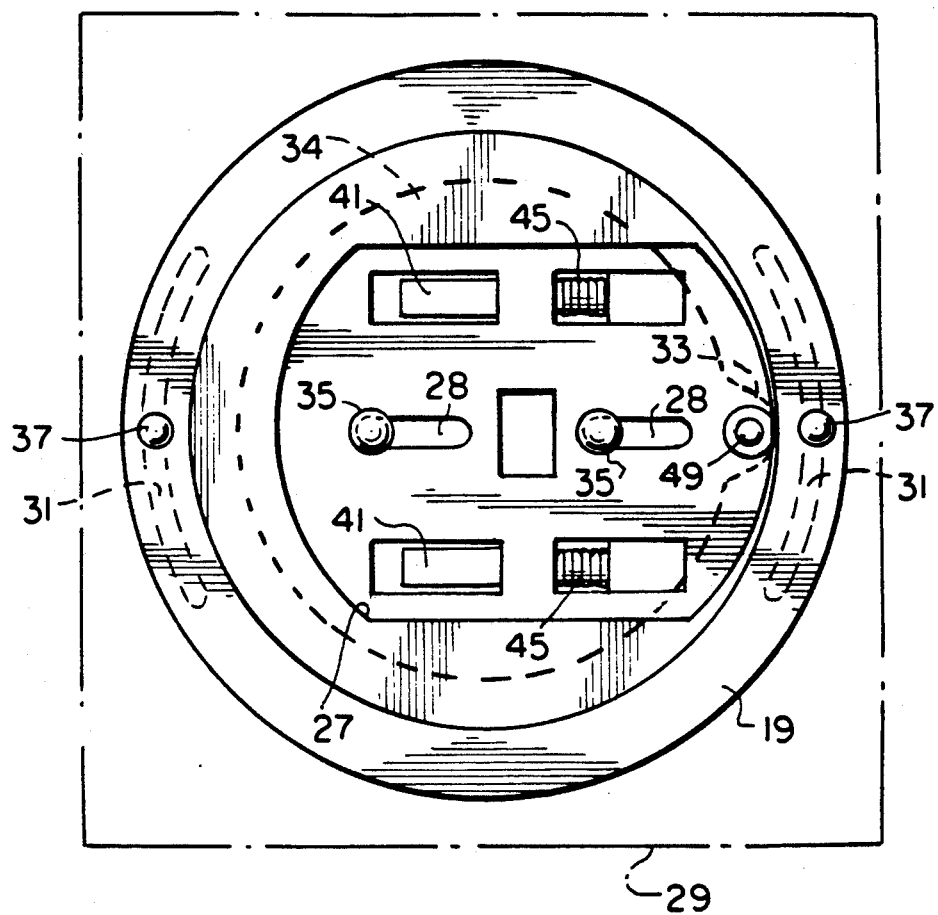
FIG. 7 is a bottom view of the turntable unit when the display unit is set in the closed position.
Figure 6:
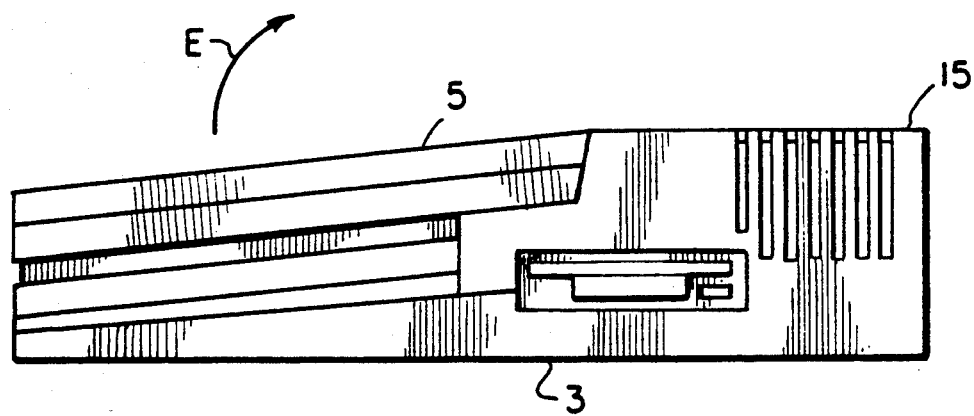
FIG. 6 is a side view of the laptop computer when the display unit is set in a closed position.

FIG. 6 illustrates laptop computer 1 when display unit 5 is set in the closed position. FIG. 7 is a bottom view of turntable unit 17 and FIG. 8 is a side view of FIG. 7, partly in cross section, when display unit 5 is set in the open position.

When display unit 5 is set in the closed position, latch claw 12 of display unit 5 engages with latch hole 10, and display unit 5 covers keyboard 9. In the closed position, a rear upper surface of rear upper case 15 is flush with an outer surface of leg 13 and an upper portion of display support 21. Turntable unit 17 is set in a second position shown in FIG. 7 and FIG. 8. Stopper pin 35 of slide plate 27 is inserted in inner recess 33 of twist guide plate 29, so that display stopper 23 folds on turntable 19.

When the operator releases the engagement between latch claw 12 and latch hole 10, display unit 5 is rotatable in a vertical direction of an arrow E. When the operator rotates display unit 5 in the vertical direction towards its erect position, a contact between leg 13 of display unit 5 and display stopper 23 is released. Coil springs 45 push slide plate 27 in the direction of arrow D. Slide plate 27 slides, along straight guide slits 28, from the second position shown in FIGS. 7 and 8 to the first position shown in FIGS. 4 and 5. Pushed portion 43 of slide plate 27 pushes pushing portion 41 of display stopper 23. Display stopper 23 rotates around axis 39 and becomes erect relative to turntable 19. Stopper pin 35 leaves inner recess 33, so that a horizontal rotation of turntable 19 is allowed.

Figure 10:
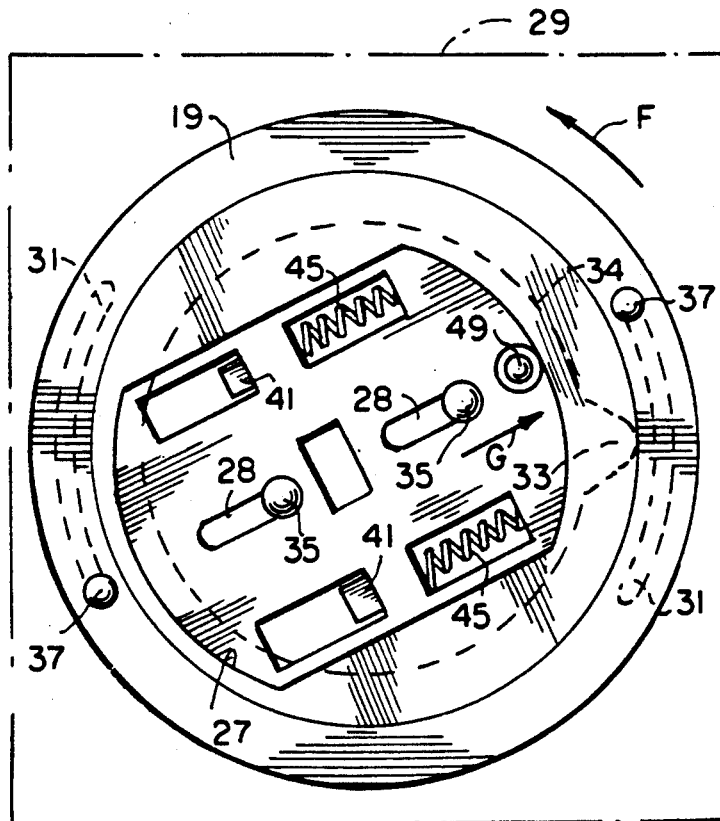
FIG. 10 is a bottom view of the turntable unit when the display unit is set in the twisted position.
Figure 9:
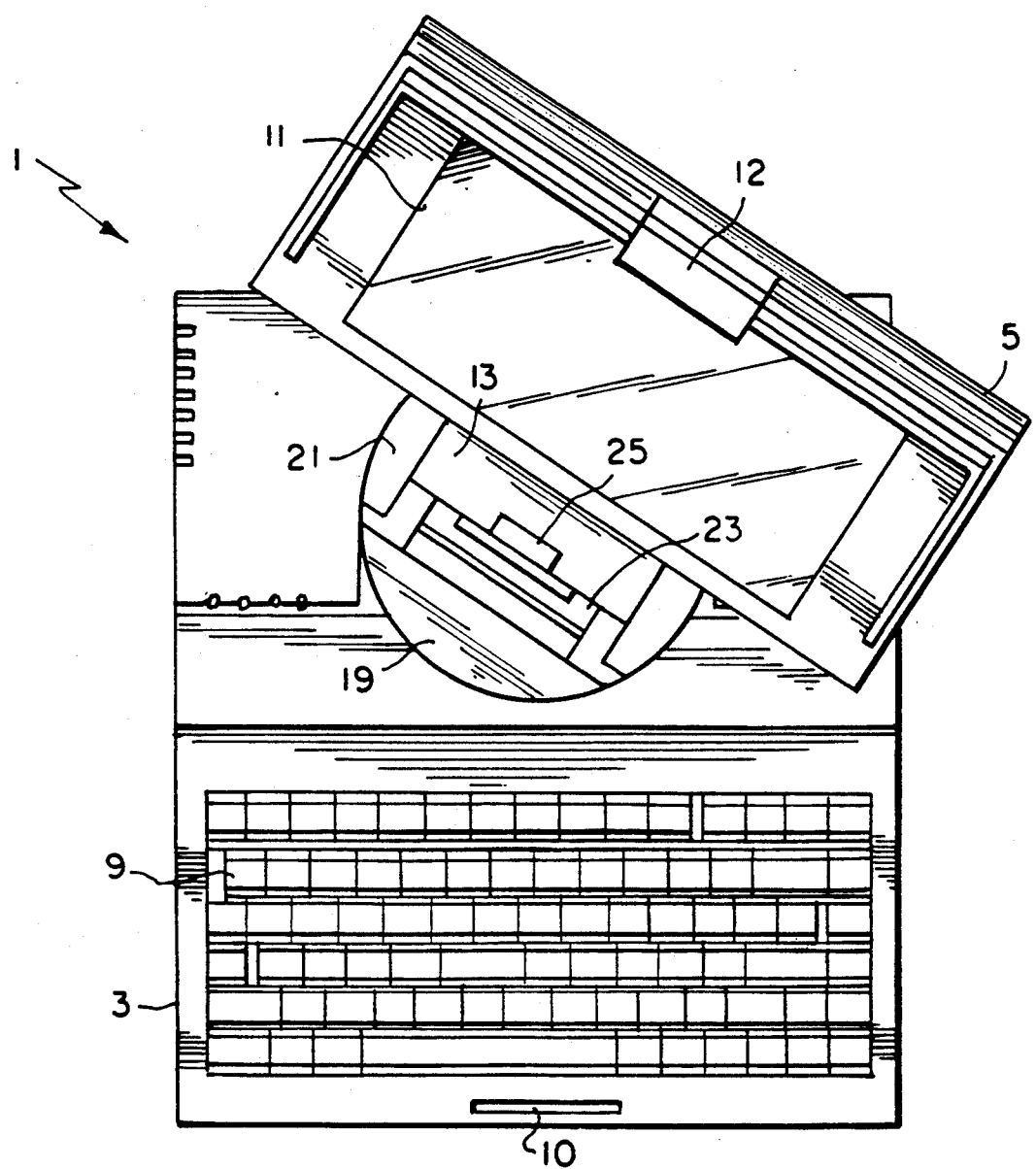
FIG. 9 is a plan view of the laptop computer when the display unit is set in a twisted position.

FIG. 9 illustrates laptop computer 1 when display unit 5 is set in the twisted position. FIG. 10 is a bottom view of turntable unit 17 when display unit 5 is set in the twisted position.

When the operator rotates display unit 5, which is set in the open position shown in FIG. 3, in a direction of an arrow F, display supporter 21 and turntable 19 rotate along curved guide slits 31. Slide plate 27 and display stopper 23 rotate in the direction of arrow F to set display unit 5 in the twisted position shown in FIG. 9. Turntable unit 17 is set in a third position shown in FIG. 10. In the third position, even though slide plate 27 can slide in direction of an arrow G, stopper pin 49 of slide plate 27 is at a position where it will not be inserted in inner recess 33 of twist guide plate 19. When slide plate 27 slides in the direction of arrow G, therefore stopper pin 49 contacts inner stopper wall 34 of twist guide plate 29 which therefore prevents slide plate 27 from further sliding in the direction of arrow G. A further vertical rotation of display stopper 23 is also prevented by inner stopper wall 34. Consequently, even though display unit 5 may be rotated in a vertical direction, display stopper 23 prevents display unit 5 from rotating in the vertical direction. Display unit 5 therefore does not strike any inner corners 16, thus preventing associated damage thereto.

Figure 11:
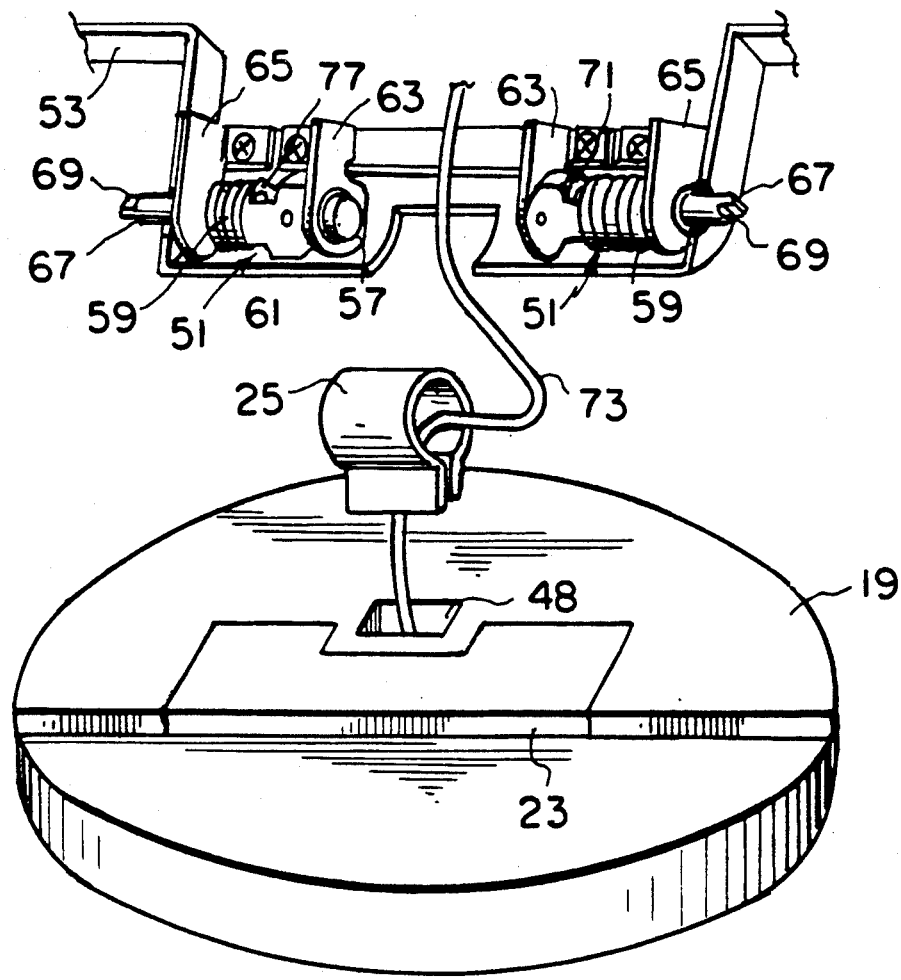
FIG. 11 is a perspective view for explaining a hinge device for vertically rotating the display unit.

FIG. 11 illustrates hinge devices 51. Each hinge device 51 has a rotation axis 57, a coil spring 59 wound on a surface of rotation axis 57, and arm 61 for generating a force by coil spring 59, fixed to rotation axis 57 and axis holders 63, 65 for pivotally holding rotation axis 57. Axis holders 63, 65 are fixed on an inner surface of leg 13 of display unit 5. One end 67 of rotation axis has a flat surface 69. End 67 is inserted in axis hole 24 (shown in FIG. 2) and fixed in display supporter 21. Display unit 5 rotates around rotation axis 57. Coil spring 59 generates a brake force for stopping display unit 5 in an arbitrary angle. Coil spring 59 has a first end (not shown) and a second end 71. The first end is fixed to axis holder 65 and rotates with display unit 5 in the vertical direction. Arm 61 prevents the second end 71 of coil spring 57 from rotating with display unit 5 in the direction of arrow A (shown in FIG. 1). Arm 61 generates its force in direction of arrow E (shown in FIG. 6) to display unit 5. Cable guide duct 25 is fixed in second cable guide hole 48. Cable 73 is guided from base unit 3 to display unit 5 through first cable guide hole 41, second cable guide hole 48 and cable guide duct 25.

A description will now be given of the procedure of making the laptop computer 1.

First, twist guide plate 29 is fixed on the bottom surface of upper rear case 15. Turntable 19, on which display supporter 21 is fixed and to which display stopper 23 is pivotally connected, is rotatably connected on twist guide plate 29 by screws 34. Next, cable 73 is inserted in first guiding hole 47 and second guiding hole 48. Cable guide duct 25, in which cable 73 is guided, is inserted in second guiding hole 48. End 67 of hinge device 51, fixed on the inner surface of outer case 53, is inserted in axis hole 24 and rotation axis 57 is fixed to display supporter 21. Inner case 55 of display unit 5 is fixed to outer case 53 to connect display unit 5 to upper rear case 15. Further, rear upper case 15, keyboard 9 and front upper cases 7 are fixed to bottom case 6.

Figure 12:
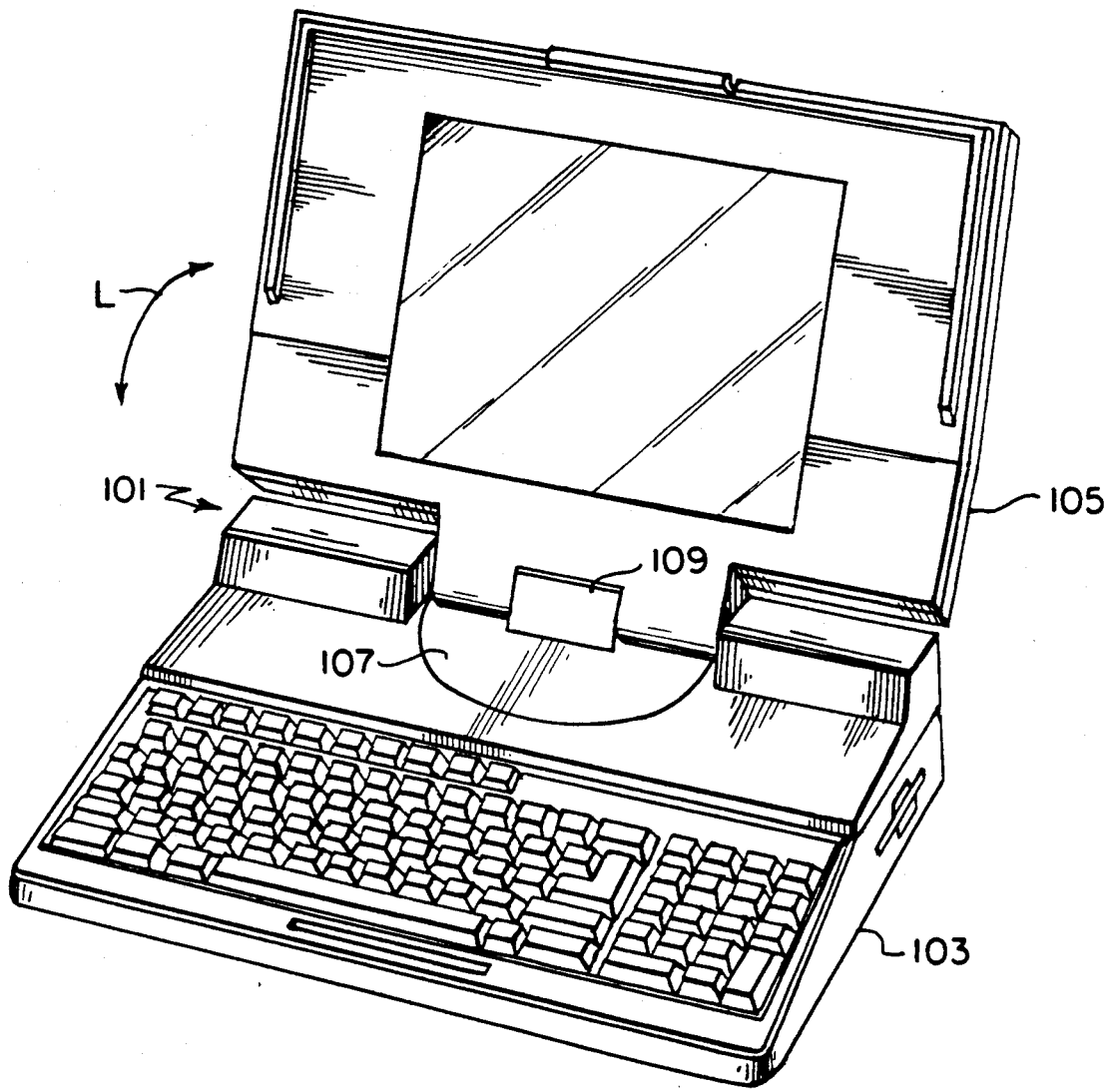
FIG. 12 is a perspective view of a laptop computer according to a second embodiment of the present invention.
Figure 13:
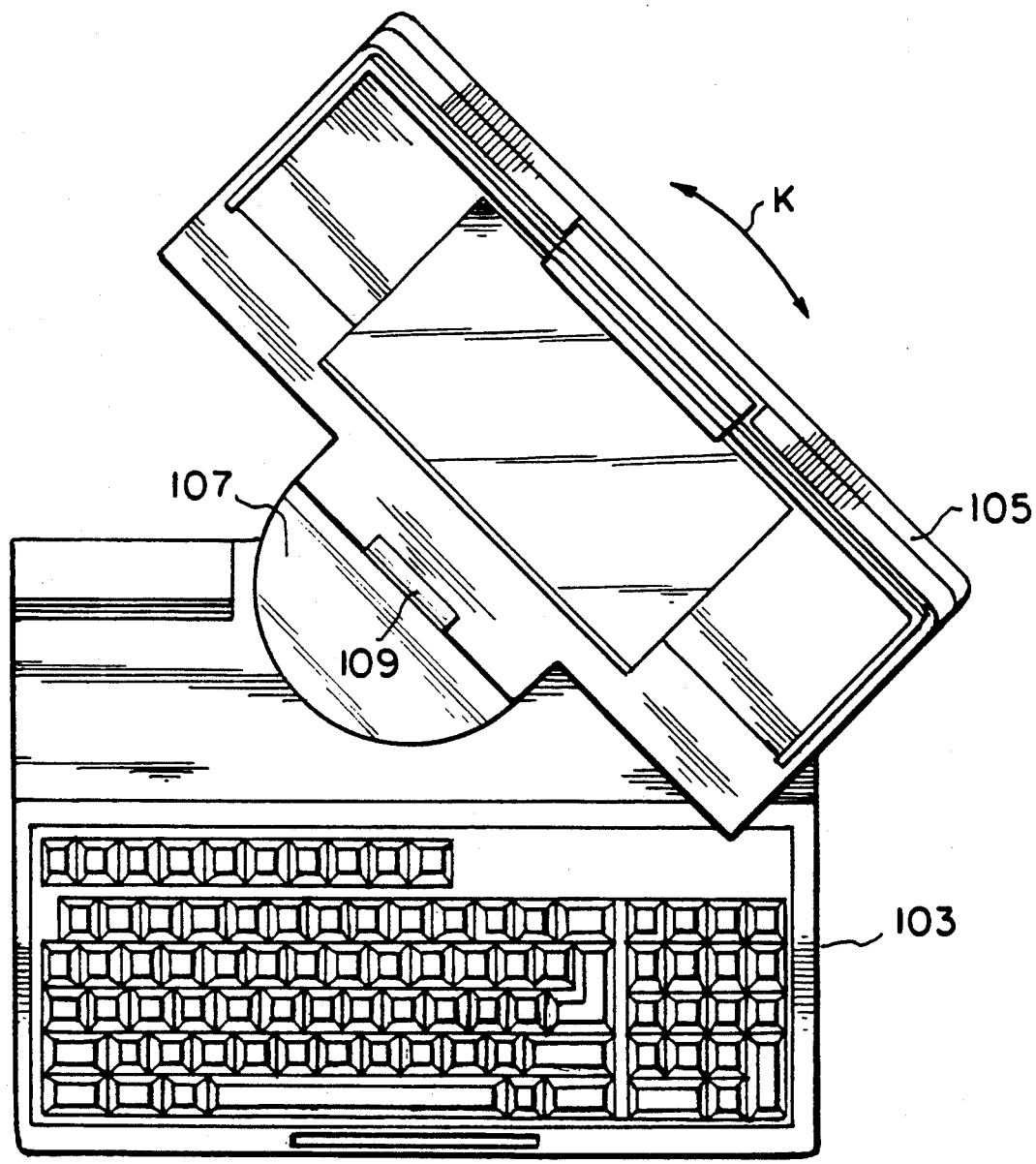
FIG. 13 is a plan view of the laptop computer according to the second embodiment when a display unit is set in a twisted position.

FIG. 12 and FIG. 13 illustrate a laptop computer according to a second embodiment of the present invention.

Laptop computer 101 of this second embodiment has a body unit 103 and a display unit 105. Body unit 103 has a turntable 107 fixing a display supporter 109. Turntable 107 rotates relative to base unit 103 in a horizontal direction (arrow K). Display unit 105 is pivotally connected to display support 109. Display unit 105 rotates in a vertical direction (arrow L). A cable, for electrically connecting base unit 103 and display unit 105, is guided by display supporter 109.

Figure 15:
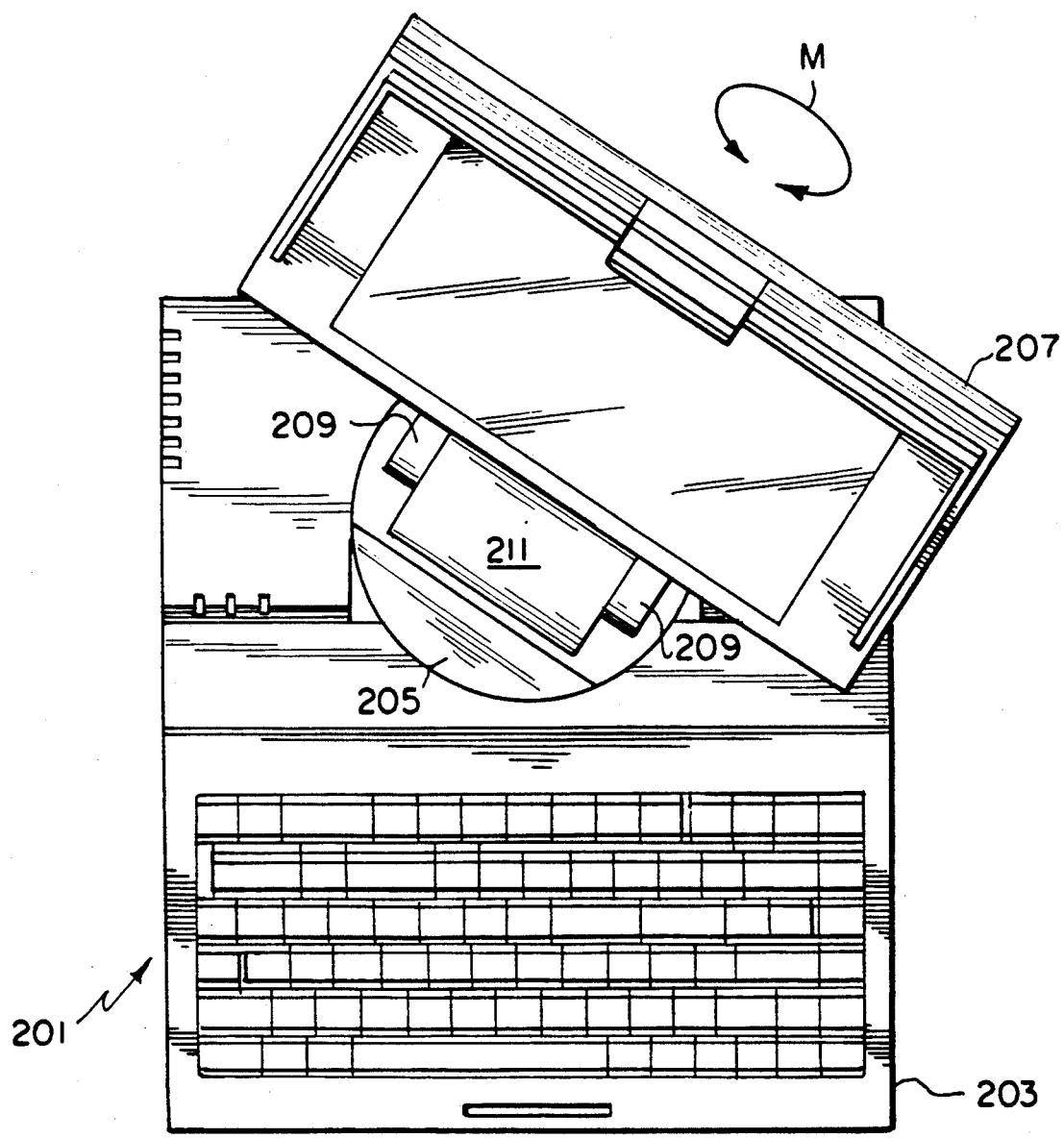
FIG. 15 is a plan view of the laptop computer of the third embodiment when a display unit is set in a twisted position.

FIG. 14 and FIG. 15 illustrate a laptop computer according to a third embodiment of the present invention.

Laptop computer 201 of this third embodiment includes a body unit 203 having a turntable 305 and a display unit 207 having a pair of legs 209. Turntable 205 has a display support 211 fixed to turntable 205. Each leg 209 is pivotally connected to display supporter 211. Turntable 205 rotates relative to base unit 203 in a horizontal direction (arrow M). Display unit 207 rotates in a vertical direction (arrow N). A cable, for electrically connecting base unit 203 and display unit 207, is guided by display supporter 211.

Although only a few embodiments have been described in detail above, those having ordinary skill in the art will certainly understand that many modifications are possible in the preferred embodiment without departing from the teachings thereof. For instance, in the above-described embodiments, the turntable rotates the leg of the display unit. However, the present invention is not limited to the above embodiments. The display unit may comprise a leg rotating only in the vertical direction and the display screen rotating in the horizontal direction relative to the leg. Also, in the above-described embodiments, the display unit of the laptop computer rotates in a vertical and a horizontal direction. However, the present invention is not limited to the above embodiments. The present invention may be applied to another portable electronic apparatus, such as a portable word processor, a measuring apparatus or a portable television, having a flat panel display pivotally connected to a base.

All such modifications are intended to be encompassed within the following claims.

What is claimed is:

1. A portable display apparatus comprising:
   a base unit having a front upper surface;
   a turntable rotatably connected to the base unit, and horizontally rotatable with respect thereto;
   a display supporter fixed on the turntable; and
   means adapted for housing a flat panel display unit, connected to the display supporter to be pivotable with respect thereto in a vertical direction, the housing means rotating in the vertical direction between a closed position for covering the front upper surface and an open position for exposing a portion of the housing means that is adapted to house the flat panel display unit and rotatable on the turntable in the horizontal direction between the open position and a twisted position for twisting the housing means relative to the open position.

2. A portable apparatus according to claim 1, wherein said housing means comprises a flat panel display unit attached therein.

3. A portable apparatus according to claim 2, wherein the base unit further comprises a table mounting portion mounting the turntable.

4. A portable apparatus according to claim 3, wherein the base unit further comprises a rear portion including a rear upper surface and a recess having the table mounting portion.

5. A portable apparatus according to claim 4, wherein the housing means further includes an outer surface which is substantially flush with the rear upper surface when the housing means is in the closed position.

6. A portable apparatus according to claim 5, wherein the display supporter comprises an upper portion which is substantially flush with the rear upper surface and the outer surface when the housing means is in the closed position.

7. A portable apparatus according to claim 2 further comprising hinge means pivotally connecting the housing means display unit to the display supporter.

8. A portable apparatus according to claim 7, wherein the hinge means further comprises an axis fixed to the display supporter, an axis supporter fixed to the housing means and pivotally supporting the axis, and a coil spring, wound around the axis for generating a braking force to stop the housing means in an arbitrary position between the open position and the closed position.

9. A portable apparatus according to claim 2 further comprising a cable guide duct, fixed to the turntable and pivotally connected to the housing means, for guiding a cable electrically connecting the display unit to the base unit.

10. A portable apparatus according to claim 1 further comprising means for preventing the vertical rotating of the flat panel display unit when it is in the twisted position.

11. A portable apparatus according to claim 10, wherein the preventing means further comprises a display stopper, pivotally connected to the turntable, rotating by the vertical rotation of the flat panel display unit, a slide portion, slidably connected to the turntable, sliding by the rotation of the display stopper, and a preventing wall, fixed to the base unit, for preventing sliding of the slide portion in the twisted position.

12. A portable apparatus according to claim 11, wherein the preventing wall further comprises a recess for receiving the sliding portion when the housing means is in the closed position.

13. A portable apparatus comprising:
a base unit having a keyboard;
a flat panel display unit having a display screen;
means for rotating the display unit in a vertical direction between a closed position where it covers the keyboard and an open position where the keyboard can be operated and rotating the display unit in a horizontal direction between the open position and a twisted position for twisting the display screen relative to the open position.

14. A portable apparatus according to claim 13 further comprising means for preventing vertical rotation of the display unit when it is in the twisted position.

15. A portable apparatus according to claim 13, wherein the base unit further comprises a recess for mounting the rotating means.

16. A portable apparatus according to claim 15, wherein the rotating means further comprises a rotator rotatably connected to the base unit in the horizontal direction and a display supporter, fixed to the rotator, vertically pivotally connecting the flat panel display unit.

17. A portable apparatus according to claim 16, wherein the rotating means further comprises a display stopper, pivotally connected to the rotator, rotating by the vertical rotation of the flat panel display unit, a slide portion, slidably connected to the rotator, sliding by the rotation of the display stopper, and a preventing wall, fixed to the base unit, for preventing sliding of the slide portion in the twisted position.

18. A portable apparatus according to claim 17, wherein the rotating means further comprises a cable guide duct, fixed to the rotator and pivotally connected to the flat panel display unit, for guiding a cable for electrically connecting the base unit and the flat panel display unit, from the base unit to the flat panel display unit through the rotator.

19. A portable apparatus according to claim 16, wherein the base unit further comprises a rear upper surface and the flat panel display unit further comprises an outer surface which is substantially flush with the rear upper surface when the flat panel display unit is in the closed position.

20. A portable apparatus according to claim 19, wherein the display supporter further comprises an upper portion which is substantially flush with the rear upper surface and the outer surface when the flat panel display unit is in the closed position.

21. A method of forming a flat panel display unit, which rotates in a vertical and a horizontal direction and having an inner case and an outer case, on a base unit, comprising the steps of:
rotatably connecting a rotator on the base unit which rotates in the horizontal direction;
pivotally connecting the outer case on the rotator such that it pivots in the vertical direction; and
fixing the inner case on the outer case.

* * * * *